US006477939B1

(12) United States Patent
Siebke

(10) Patent No.: US 6,477,939 B1
(45) Date of Patent: Nov. 12, 2002

(54) PRESSURE SPRING ARRANGEMENT IN A BRAKE CYLINDER, ESPECIALLY OF PARKING BRAKES INSTALLED IN COMMERCIAL VEHICLES

(75) Inventor: Alf Siebke, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/807,326

(22) PCT Filed: Oct. 11, 1999

(86) PCT No.: PCT/EP99/07605

§ 371 (c)(1),
(2), (4) Date: Jul. 3, 2001

(87) PCT Pub. No.: WO00/21813

PCT Pub. Date: Apr. 20, 2000

(30) Foreign Application Priority Data

Oct. 12, 1998 (DE) .......................................... 198 46 850

(51) Int. Cl.$^7$ ............................................... F01B 31/00
(52) U.S. Cl. ..................................................... 92/130 R
(58) Field of Search .......................... 92/130 A, 130 R, 92/63, 130 C

(56) References Cited

U.S. PATENT DOCUMENTS

| 3,696,711 | A | * | 10/1972 | Berg et al. ...................... 92/48 |
| 3,782,251 | A | * | 1/1974 | Le Marchand ........ 92/130 A X |
| 3,811,365 | A | * | 5/1974 | Gordon et al. ......... 92/130 A X |
| 3,896,706 | A | * | 7/1975 | Newstead et al. .... 92/130 A X |
| 3,926,094 | A | * | 12/1975 | Kurichh et al. ....... 92/130 A X |
| 4,478,137 | A | * | 10/1984 | Clark ................... 92/130 A X |
| 4,480,531 | A | * | 11/1984 | Mylius et al. ........ 92/130 A X |
| 4,889,037 | A | * | 12/1989 | Goral et al. .......... 92/130 A X |
| 5,263,403 | A | * | 11/1993 | Choinski et al. ...... 92/130 A X |

FOREIGN PATENT DOCUMENTS

| DE | 26 29 565 | 1/1978 |
| DE | 29 32 500 | 2/1981 |
| DE | 35 36 767 | 4/1987 |
| EP | 0 020 862 | 1/1981 |
| FR | 2 562 622 | 10/1985 |

* cited by examiner

Primary Examiner—John E. Ryznic
(74) Attorney, Agent, or Firm—Crowell & Moring LLP

(57) ABSTRACT

The invention relates to a pressure spring arrangement for brake cylinders, especially of the type installed in commercial vehicles. When using a pressure spring which comprises at least one retracted end, the facing support for the final winding is configured such that when the spring tip of the final winding is applied, a degree of freedom of the deformation exists for the final winding of the pressure spring which exists with a negative angle of incidence, i.e. with an inclination direction contrary to the angle of inclination of the springy windings of the pressure spring. When the final winding of the pressure spring emerges into the adjacent spring winding and during simultaneous deformation along the negative angle of incidence, the pressure spring absorbs additional energy which can be converted into increased spring action during a lifting movement. A roll-off ramp advantageously predetermines the degree of freedom of the deformability of the final winding along a negative angle of incidence. Said roll-off ramp is either directly configured on the side of the piston or of the base, said side facing the pressure spring, or is configured on the facing side of an insert which can be separately inserted.

30 Claims, 4 Drawing Sheets

PRESSURE SPRING ARRANGEMENT IN A BRAKE CYLINDER, ESPECIALLY OF PARKING BRAKES INSTALLED IN COMMERCIAL VEHICLES

The invention relates to a pressure spring arrangement in accordance with the preamble of patent claim 1.

For parking brakes in commercial vehicles spring-loaded cylinders are usually installed, either alone or in combination with service brake cylinders. To store the required actuating force of the brake and to carry out the working lift, screw—pressure springs are usually used that are pneumatically prestressed.

The design of such pressure or accumulator springs is defined by a plurality of criteria, of which the available installation space and the targeted output force are significant. Maximum output force at a defined working point (for example, ½ lift maximum) with simultaneously limited release pressure and limited construction space is possible only with a spring characteristic that is as flat as possible, that is, at a minimum spring rate. It can be influenced, among other things, by the number of windings, since as the number of windings increases, the spring rate decreases. Theoretically the result is an optimally soft spring at a specified maximum tension, when the available construction space for the spring has been completely filled.

Prior art designs make allowance for this fact with diverse measures. Spring sets are used, where two or more springs are connected in parallel. Furthermore, so-called miniblock springs are used, whose windings can immerge into each other at least over some sections. Such types of springs are characterized by the diameter of the winding that decreases in the direction of both ends of the spring (rolled-up spring) and by the cross section of the wire that decreases with the diameter of the winding (DE 35 36 767 A1).

However, the described construction methods for pressure springs of the type under discussion must be regarded as disadvantageous with respect to the production costs of a brake cylinder. Whereas in the first case the use of several springs leads to higher production and assembly costs, in the second embodiment the process of forming the spring rod must be regarded as expensive.

Given this situation, the object of the invention is to provide for brake cylinders of the type under discussion an inexpensive possibility of using as much as possible the available construction space in the spring chamber. In this respect the goal is, as compared to the conventional arrangement, to increase the spring action during a lifting movement under spring load.

The features, disclosed in the characterizing part of patent claim 1, serve to solve this problem.

Due to the fact that the pressure spring is configured as a rolled up spring and that it is braced, on the one hand, against the piston and, on the other hand, against the housing or base of the brake cylinder, the goal is reached that with the specified outer dimensions of the brake cylinder a comparably higher spring force is obtained. That is, with the use of a rolled-up spring as the pressure spring and with the support face, which exhibits a negative roll-off angle and is located at the piston and/or the housing or the base of the brake cylinder the goal is reached that additional work must be generated to deform the ends when tensioning the pressure spring. The consequence. is that the pressure spring absorbs more energy, which during relaxation can be converted into increased spring action.

As a general principle it must be regarded as adequate within the scope of the inventive idea if, when the pressure spring is tensioned, the final winding(s) of the pressure spring exhibit(s) an adequate degree of freedom of the deformation at a negative angle within the respective adjoining spring winding(s). The goal is to feed energy to the pressure spring along its entire spring length during tensioning, thus preferably beginning from both tips of the windings on the two spring ends. In this sense the spring end(s) of the pressure spring could remain within its/their degree of freedom of the deformation without making direct contact with or positioning against the piston or the housing, although the bracing, which takes place for example at 270 degrees, and the fixing in position with respect to the abutment must be regarded as advantageous for guiding and securing the pressure spring so as not to rotate.

Advantageous designs and further developments are disclosed in the other patent claims.

The invention is explained below by means of embodiments with reference to the patent claims.

Figure 1:
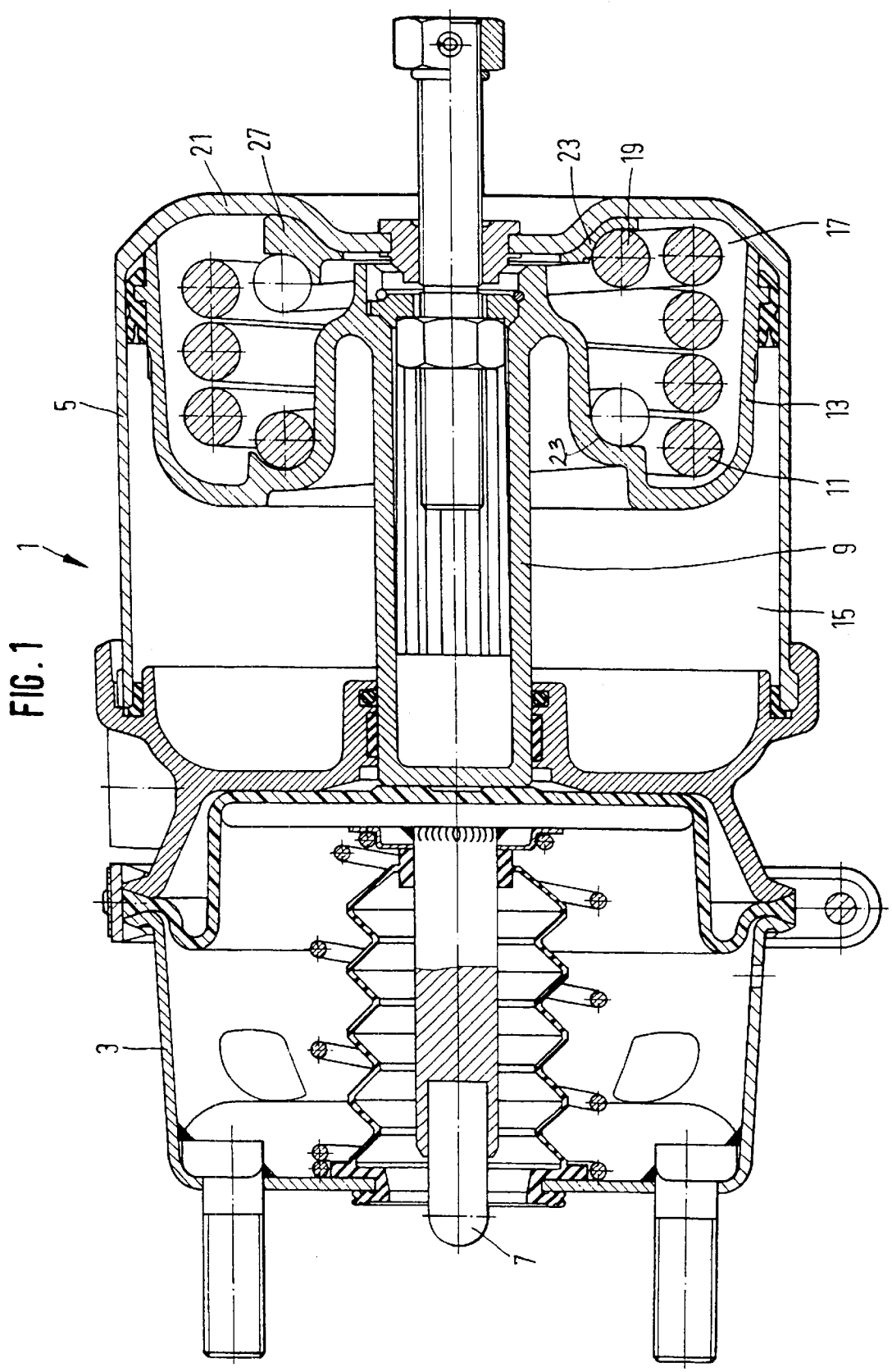
FIG. 1 is a longitudinal sectional drawing of a brake cylinder with a spring arrangement, according to the invention.

The drawing in FIG. 1 depicts an embodiment of a brake cylinder, implementing the inventive pressure spring arrangement. The illustrated brake cylinder 1 comprises a combined service brake and spring accumulator brake cylinder, which is also called a combination cylinder and which comprises the service brake cylinder 3 and the spring accumulator brake cylinder 5. The service brake cylinder 1 corresponds to a well-known construction and exhibits an actuating tappet 7, which can act on a brake mechanism of a motor vehicle. The spring accumulator brake cylinder 5 is provided, on the one hand, with a piston rod 9, which acts rearwards on the service brake cylinder and which bears a piston 13, which can be loaded by a pressure spring 11. The piston 13 divides the housing of the spring accumulator brake cylinder into a pressure chamber 15 and a spring chamber 17, wherein compressed air can be passed into the pressure chamber 15 in order to slide the piston 13 to the right in the drawing according to FIG. 1 and thus to tension the pressure spring 11. For pressure relief in the pressure chamber 15, the pressure spring 11, also called an accumulator spring, can slide in such a manner the piston 13 with the piston rod 9 to the left, as depicted in FIG. 1, that with interposition of the service brake cylinder the actuating tappet 7 can be slid.

The pressure spring 11 was explained above as a pressure spring, located in the spring accumulator brake cylinder of a combination cylinder. Within the scope of the general idea of the invention, however, the pressure spring can also be used in brake cylinders of a different construction or a different operating characteristic. Thus, the pressure spring can be used in a conventional spring accumulator brake cylinder; it can also be installed so as to act as a reset spring, thus as a spring that acts in a direction contrary to the actuating stroke of a brake cylinder. When the brake of a motor vehicle is released and reset, said spring is applied.

Figure 2:
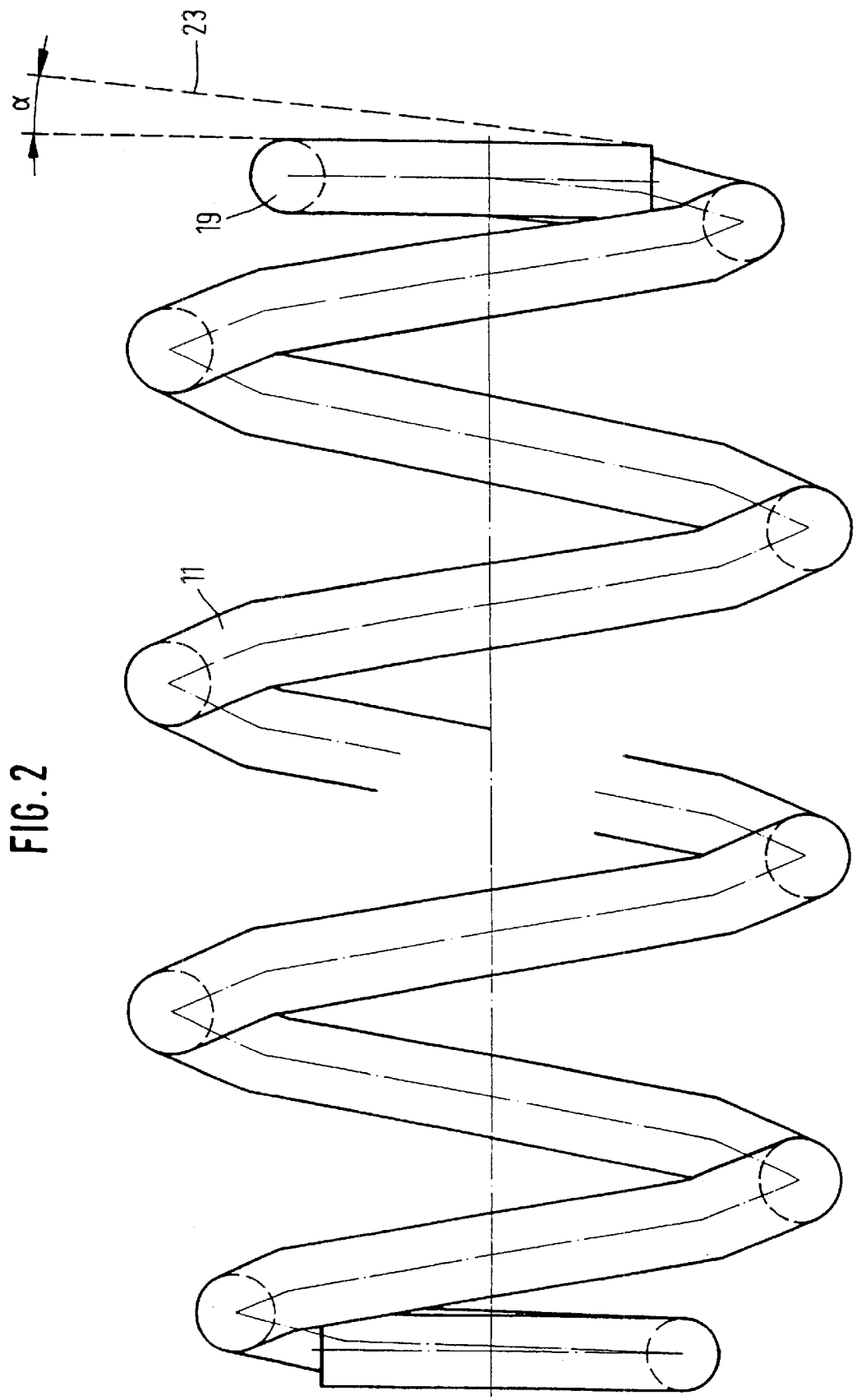
FIG. 2 is a detailed drawing of the ends of the pressure spring and a schematic drawing of one of the negatively tilted roll-off ramps.

In the case of pressure springs of the type under discussion, the invention provides that the available construction space within the windings of the pressure spring is used, as explained below. One of the final windings 19 of the pressure spring or both final windings immerge(s) in such a manner into the first or other springy windings of the corresponding side of the pressure spring 11 that in the completely compressed state (lift=0) the spring length is reduced. The basic shape of the pressure spring matches the known shape of a cylindrical spring with two retracted ends or one retracted end or a barrel shape. In this respect an important feature is the configuration of the spring facing supports of the piston or housing side. They are designed with a negative inclination, thus contrary to the winding pitch of the pressure spring 11. Thus, the goal is reached that during installation the pressure spring stands first with the tips of both final windings 19 on the piston 13 or the base 21 of the housing. Hence, the tips of the final windings 19 are located at the highest point of an inclined helical roll-off ramp 23 at an angle a of the negative inclination (FIG. 2). This state exists when the pressure spring is relaxed. In the case of a subsequent compression, the final windings 19 of the pressure spring roll down the roll-off ramp 23 and thus it also has a negative direction of inclination, contrary to the sense of pitch of the springy windings of the pressure spring. The result is the position of the final windings within the first or other springy winding, as depicted in FIG. 1 of the drawings.

Since additional work must be generated for the aforementioned deformation of the spring ends of the pressure spring, said pressure spring also absorbs more energy so that said energy can be converted into increased spring action during a lifting movement under spring load. If the same pressure spring were put on planar supporting faces of the piston or the base of the spring accumulator brake cylinder, the spring ends or the final windings would not be involved in the springy action, and no increase in the spring load would occur owing to the lack of deformation.

In the inventive configuration of the spring arrangement the pressure spring 11 and the roll-off ramp 23 are coordinated in such a manner that in the compressed state (FIG. 1) there is a defined roll-off area a, which amounts to about 270 degrees owing to the uniform introduction of force. However, other values can also be generated.

In the embodiment depicted in FIG. 1, the ramp 19 is designed at the piston 13 with the same material as used for the piston. The end of the ramp exhibits a stop 25 (FIG. 3) for the spring tip of the pressure spring 11. The stop 25 acts to secure the pressure spring in position so as not to rotate and defines the correct starting position during assembly.

Figure 3:
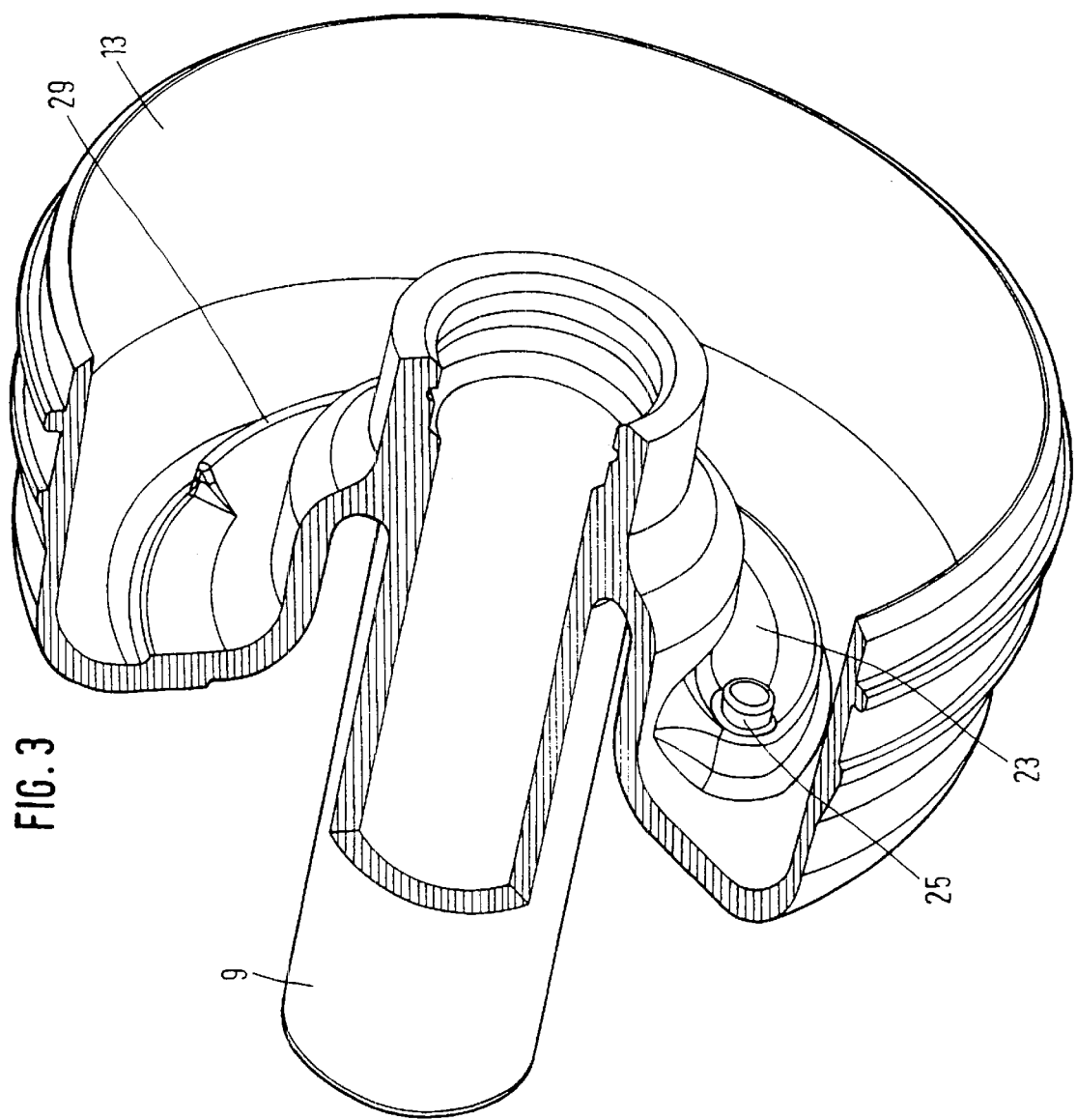
FIG. 3 is a part sectional drawing of a piston of the type depicted in FIG. 1; said piston exhibits the roll-off ramp with a negative inclination.
Figure 4:
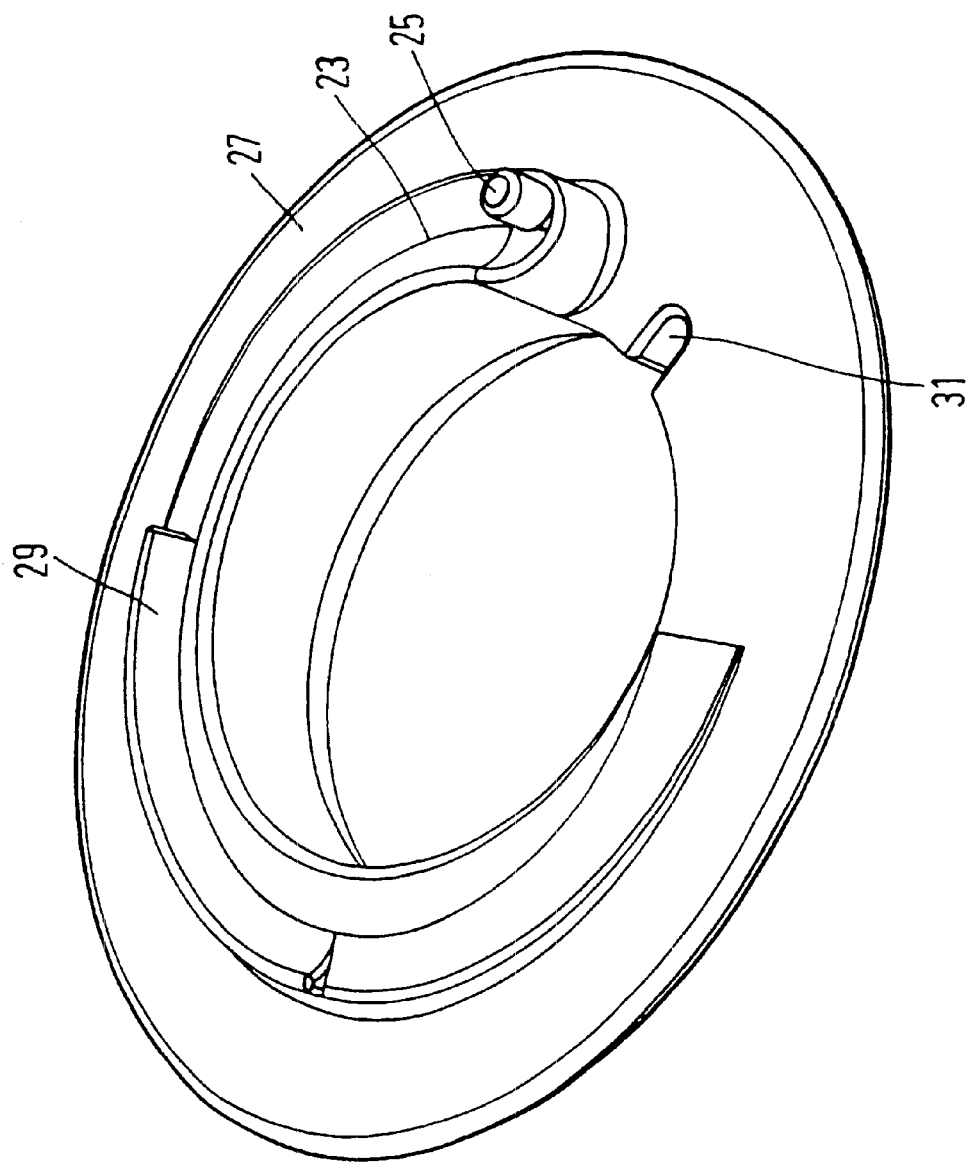
FIG. 4 is a detailed drawing of an insert, exhibiting a negatively tilted roll-off ramp, for the piston or the housing base of the brake cylinder.

As a general rule, the roll-off ramps 23 do not have to be integrated into the piston or base components of the housing, as is the case with the piston 13, according to FIG. 3. For reasons relating to production engineering and cost, it proved to be advantageous to install separate inserts. FIGS. 1 and 4 depict an insert 27, which is adapted to the base 21 of the brake cylinder and where the roll-off ramp, exhibiting the negative inclination, is designed with a stop 25. In addition, the insert exhibits a centering rib 29 for the pressure spring.

Inserts 27 of the aforementioned type of construction, which can be made, for example, of plastic, offer the advantage that they can be quickly interchanged. That is, the inserts can be used at roll-off ramps with different angles of inclination. The inserts in turn are provided preferably with means to secure anti-rotationally in position inside the housing. In the embodiment according to FIG. 4, there is a groove 31, with which a pin (not illustrated) on the piston or base of the housing can engage in order to form such an antirotational securing for the purpose of preventing the insert from turning.

The spring arrangement was explained above with reference to the roll-off ramp 23, which acts as the spring support face for the pressure spring in the compressed state. In this respect it is important that the final winding in an angular range of, for example, 270 degrees, can be applied along a negative inclination in order to generate additional work for the deformation of the spring ends. However, it is not absolutely necessary that the final winding(s) of the pressure spring make flush contact. That is, it is of primary importance that the final winding, beginning from the spring tip, has an adequate degree of freedom of deformation to absorb more energy as the negative sense of inclination increases. Hence, the final winding of the pressure spring can travel without making contact with the facing base or piston, so that an end stop 21 on the piston or the housing base forms the only direct contact point of the final winding (s) of the pressure spring. When rolling down the ramp, be it with or without insert, there is, however, the advantageous possibility that when the spring is accurately centered, the stroke can be precisely defined. With respect to the shape of the pressure spring in its relaxed state (FIG. 2), the final winding can be tilted, of course, at a positive or negative angle. Hence, during compression the degree of deformation and the deformation work to be generated is also determined.

List of Reference Numerals

1 brake cylinder
3 service brake cylinder
5 spring accumulator brake cylinder
7 actuating tappet
9 piston rod
11 pressure spring
13 piston
15 pressure chamber
17 spring chamber
19 final winding
21 base
23 roll-off ramp
25 stop
27 insert
29 centering rib
31 groove

What is claimed is:

1. Pressure spring arrangement in a brake cylinder, said pressure spring arrangement comprising:
    a helical pressure spring, which is located between a piston, which can be slid in a housing of the brake cylinder, and a base of the brake cylinder housing, the pressure spring being tensionable during piston displacement and having at least one retracted final winding, which is immergeable into an adjacent spring winding when tensioning the pressure spring; and
    wherein, when a spring tip rests against the piston or the base of the brake cylinder housing, the final winding exhibits, over a predetermined angular range, a degree of deformation freedom along a negative direction of inclination contrary to a sense of pitch of the spring windings of the pressure spring.

2. Pressure spring arrangement according to claim 1, wherein the deformation along the negative direction of inclination does not make contact, with the exception of the bracing of the spring tip, with a facing surface of the piston or the base.

3. Pressure spring arrangement according to claim 1, wherein upon contact, additional deformation occurs along a roll-off ramp formed at the piston or the base.

4. Pressure spring arrangement according to claim 2, wherein upon contact, additional deformation occurs along a roll-off ramp formed at the piston or the base.

5. Pressure spring arrangement according to claim 3, wherein the roll-off ramp is formed at the piston or the base of the brake cylinder in an angular range of approximately 270 degrees and ends in a stop for the spring tip of the final winding.

6. Pressure spring arrangement according to claim 1, further comprising:
   a separate insert adapted to a side of the piston or base of the brake cylinder housing facing the pressure spring; and
   a roll-off ramp, corresponding to a deformation, which exhibits a negative angle and belongs to the final winding of the pressure spring, designed in an angular range of preferably 270 degrees on the insert.

7. Pressure spring arrangement according to claim 6, further comprising a stop located at an end of the roll-off ramp for the spring tip of the pressure spring.

8. Pressure spring arrangement according to claim 1, further comprising:
   at least one insert provided for the piston or the base of the brake cylinder housing;
   a rotational securing device for securing the relative position of the insert with respect to the piston or the base of the brake cylinder housing.

9. Pressure spring arrangement according to claim 1, wherein a centering rib for the final winding of the pressure spring is designed on the piston or the base of the brake cylinder housing.

10. Pressure spring arrangement according to claim 6, wherein a centering rib for the final winding of the pressure spring is designed on the insert.

11. Pressure spring arrangement according to claim 6, wherein the insert is made of plastic.

12. Brake cylinder, comprising:
    a helical pressure spring, which is located between a piston, which piston is slidable in a housing of the brake cylinder, and a base of the brake cylinder housing, the pressure spring being tensionable during piston displacement according to claim 1.

13. Brake cylinder according to claim 12, wherein the brake cylinder is a spring accumulator brake cylinder.

14. Brake cylinder according to claim 13, wherein the spring accumulator brake cylinder is coupled to a service brake cylinder in the form of a combined service brake and spring accumulator brake cylinder.

15. A pressure spring arrangement in a brake cylinder having a brake cylinder housing, comprising:
    a pressure spring arrangeable in the brake cylinder housing between a piston and a base of the brake cylinder housing, the pressure spring having a pitch sense of its spring windings and at least one retracted final winding immergeable into an adjacent spring winding when tensioned;
    wherein the at least one retracted final winding, over a predetermined angular range, is provided with a degree of deformation freedom along a negative direction of inclination in contrast to the pitch sense of the spring windings.

16. The pressure spring arrangement according to claim 15, wherein a spring tip of the at least one retracted final winding rests against the piston or the base of the brake cylinder housing.

17. The pressure spring arrangement according to claim 15, further comprising:
    an insert adapted to one of the piston and the base of the brake cylinder housing; and
    wherein a spring tip of the at least one retracted final winding rests against one of the piston, the base of the brake cylinder housing, or the insert.

18. The pressure spring arrangement according to claim 16, wherein the deformation freedom of the final winding along the negative direction of inclination does not make contact with a facing surface of the piston or base except for the spring tip.

19. The pressure spring arrangement according to claim 17, wherein the deformation freedom of the final winding along the negative direction of inclination does not make contact with a facing surface of the piston, base or insert except for the spring tip.

20. The pressure spring arrangement according to claim 16, further comprising a roll-off ramp formed on the piston or base, wherein upon contact of the pressure spring, an additional deformation along the negative direction of inclination occurs on the roll-off ramp.

21. The pressure spring arrangement according to claim 17, further comprising a roll-off ramp formed on the piston, base or insert, wherein upon contact of the pressure spring, an additional deformation along the negative direction of inclination occurs on the roll-off ramp.

22. The pressure spring arrangement according to claim 20, wherein the roll-off ramp has an angular range of approximately 270° and includes a stop for the spring tip of the final winding.

23. The pressure spring arrangement according to claim 21, wherein the roll-off ramp has an angular range of approximately 270° and includes a stop for the spring tip of the final winding.

24. The pressure spring arrangement according to claim 17, wherein the insert further comprises a rotational securement to fix the relative position of the insert with respect to the piston or base of the brake cylinder housing.

25. The pressure spring arrangement according to claim 16, further comprising a center rib for the final winding of the pressure spring arranged on the piston or base of the brake cylinder housing.

26. The pressure spring arrangement according to claim 17, further comprising a center rib for the final winding of the pressure spring arranged on the piston, base or insert.

27. The pressure spring arrangement according to claim 17, wherein the insert is made of plastic.

28. The pressure spring arrangement according to claim 15, wherein the pressure spring has two retracted final windings, both of said final windings exhibiting over the predetermined angular range the negative direction of inclination.

29. The pressure spring arrangement according to claim 16, wherein the pressure spring has two retracted final windings, both of said final windings exhibiting over the predetermined angular range the negative direction of inclination.

30. The pressure spring arrangement according to claim 17, wherein the pressure spring has two retracted final windings, both of said final windings exhibiting over the predetermined angular range the negative direction of inclination.

\* \* \* \* \*